(12) United States Patent
Kato

(10) Patent No.: US 7,679,761 B2
(45) Date of Patent: *Mar. 16, 2010

(54) DATA PROCESSING DEVICE, FACSIMILE MACHINE HAVING DATA PROCESSING FUNCTION, AND COMPUTER PROGRAM

(75) Inventor: Tokunori Kato, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1730 days.

This patent is subject to a terminal disclaimer.

(21) Appl. No.: 10/807,393

(22) Filed: Mar. 24, 2004

(65) Prior Publication Data

US 2004/0190074 A1    Sep. 30, 2004

(30) Foreign Application Priority Data

Mar. 28, 2003  (JP) .............................. 2003-092429

(51) Int. Cl.
*G06F 15/10* (2006.01)

(52) U.S. Cl. ..................... 358/1.15; 358/1.13; 358/400; 709/206; 709/225; 709/93.01; 379/100.01; 379/100.09; 379/68; 379/88.12

(58) Field of Classification Search ................. 358/474, 358/1.15, 442, 402, 403, 1.14, 1.13, 302, 358/400, 524; 379/100.93, 100.01, 100.09, 379/206, 213, 68, 88.12; 709/206, 93.01, 709/208, 225, 213, 224, 205
See application file for complete search history.

(56) References Cited

U.S. PATENT DOCUMENTS

| 4,733,303 | A  | * | 3/1988 | Koshiishi ..................... 358/400 |
|---|---|---|---|---|
| 5,666,549 | A  | * | 9/1997 | Tsuchiya et al. ............. 715/223 |
| 5,943,277 | A  | * | 8/1999 | Shimizu ...................... 365/201 |
| 6,583,889 | B1 | * | 6/2003 | Koyanagi et al. ........... 358/1.16 |
| 7,016,067 | B1 | * | 3/2006 | Tsukamoto ................ 358/1.16 |
| 7,139,093 | B2 | * | 11/2006 | Iida ............................. 358/1.15 |
| 7,200,617 | B2 | * | 4/2007 | Kibuse ......................... 707/200 |
| 7,209,253 | B2 | * | 4/2007 | Takayama .................. 358/1.15 |
| 7,307,744 | B2 | * | 12/2007 | Hikawa ...................... 358/1.14 |
| 7,533,151 | B2 | * | 5/2009 | Takashima .................. 709/206 |
| 2002/0063877 | A1 | * | 5/2002 | Lucivero et al. ........... 358/1.13 |
| 2003/0061569 | A1 | * | 3/2003 | Aoki .......................... 715/517 |
| 2003/0128383 | A1 | * | 7/2003 | Teranoshita ................ 358/1.15 |
| 2003/0167398 | A1 | * | 9/2003 | Sueyoshi et al. ............. 713/189 |
| 2003/0200503 | A1 | * | 10/2003 | Koppich et al. ............. 715/500 |
| 2003/0234952 | A1 | * | 12/2003 | Abe ........................... 358/1.14 |
| 2004/0179224 | A1 | * | 9/2004 | Kidokoro ................... 358/1.14 |
| 2004/0190073 | A1 | * | 9/2004 | Kato et al. .................. 358/400 |

FOREIGN PATENT DOCUMENTS

| JP | A 2001-282694 | 10/2001 |
|---|---|---|
| JP | A-2002-290603 | 10/2002 |

* cited by examiner

*Primary Examiner*—Negussie Worku
(74) *Attorney, Agent, or Firm*—Oliff & Berridge, PLC

(57) ABSTRACT

A digital multifunction device is provided with RAM having a virtual drive area. The digital multifunction device enables a personal computer connected to and capable of communicating with the digital multifunction device via a USB interface to recognize this virtual drive area as an external storage device. When the personal computer writes image data to the virtual drive area, the digital multifunction device selectively executes one of an image forming process, fax transmitting process, and mail transmitting process based on the type of folder in which the image data is written. Accordingly, image data in a first folder is printed on recording paper, or image data in a second folder is transmitted to an external facsimile machine.

16 Claims, 12 Drawing Sheets

FIG.8

| DATE | TIME | TYPE | FROM/TO | DURATION | PAGE | RESULT | FILE NAME |
|---|---|---|---|---|---|---|---|
| 2003/2/10 | 15:10 | Rx (RECEPTION) | AAAAA | 100 | 3 | OK | 200302101510 |
| 2003/2/11 | 10:20 | Tx (TRANSMISSION) | BBBBB | 20 | 2 | OK | 200302111020 |

DATA PROCESSING DEVICE, FACSIMILE MACHINE HAVING DATA PROCESSING FUNCTION, AND COMPUTER PROGRAM

BACKGROUND OF THE INVENTION

The present invention relates to a data processing device for handling image data, a facsimile machine having data processing function, and a computer program employed by the data processing device and the facsimile machine.

Data processing devices well known in the art for performing prescribed processes on image data supplied from a terminal device include an image forming device such as a printer, and a facsimile machine for transmitting facsimile data to another facsimile machine specified by the terminal device.

For example, in the technology described in Japanese patent application publication No. 2001-282694, a personal computer is enabled to exchange various data with a facsimile machine by installing a driver program on the personal computer as a terminal device. The facsimile machine is enabled to accept image data from the personal computer by displaying a folder icon on the monitor of the personal computer.

This facsimile machine includes a facsimile transmission function and a printer function. When image data is moved to the folder displayed on the monitor by a drag-and-drop operation, a dialog box is displayed on the monitor of the personal computer asking the user whether to send the data as a facsimile transmission or to print out the data. When a function is selected through a user operation, a facsimile transmission operation or a printing operation is performed on the image data moved to the folder based on the selected function.

However, the technology described above requires preparation, such as installing a special driver program on the personal computer. These operations are troublesome and inconvenient for the user. Further, since the installation of driver programs and the like can be difficult operations for beginners not well-versed in computers, users have been waiting for an easier method to use the above functions.

SUMMARY OF THE INVENTION

In view of the foregoing, it is an object of the present invention to provide a data processing device and a facsimile machine capable of obtaining image data from a terminal device and performing prescribed processes on the image data without incorporating a special driver program or the like in the terminal device, and to provide a computer program used by the data processing device and facsimile machine.

This and other objects of the present invention will be attained by a data processing device connected to and in communication with a terminal device, the data processing device including a storing unit, a recognition setting unit and a data processing unit. The storing unit has a storage area for storing image data. The recognition setting unit enables the terminal device to recognize the storage area in the storing unit as an external storage device. The data processing unit reads image data from the storage area in the storing unit when image data is written to the storage area from the terminal device and executes a prescribed process on the image data.

In another aspect of the invention, there is provided a facsimile machine including a communicating unit connected to an external network and capable of transmitting and receiving facsimile data and the processing device connected to and in communication with a terminal device through the external network. The data processing device includes a storing unit having a storage area for storing the facsimile data, a recognition setting unit that enables the terminal device to recognize the storage area in the storing unit as an external storage device, and a data processing unit that reads the facsimile data from the storage area in the storing unit when the facsimile data is written to the storage area from the terminal device and executes a prescribed process on the facsimile data.

In still another aspect of the invention, there is provided a storage medium that stores a program for permitting a facsimile machine to function as a data processing device. The facsimile machine includes a communication unit connected to a terminal device through a network, and a storage unit including a storage area that stores therein image data. The program includes a program of enabling the terminal device to recognize the storage area in the storing unit as an external storage device, and a program of reading image data from the storage area in the storing unit when image data is written to the storage area from the terminal device and executing a prescribed process on the image data.

BRIEF DESCRIPTION OF THE DRAWINGS

In the drawings:

FIG. 2(a) is an explanatory diagram showing a structure of a RAM 12 when virtual drive function is on;

FIG. 8 is an explanatory diagram showing a structure of a log file;

DETAILED DESCRIPTION OF THE PREFERRED EMBODIMENT

Figure 1:
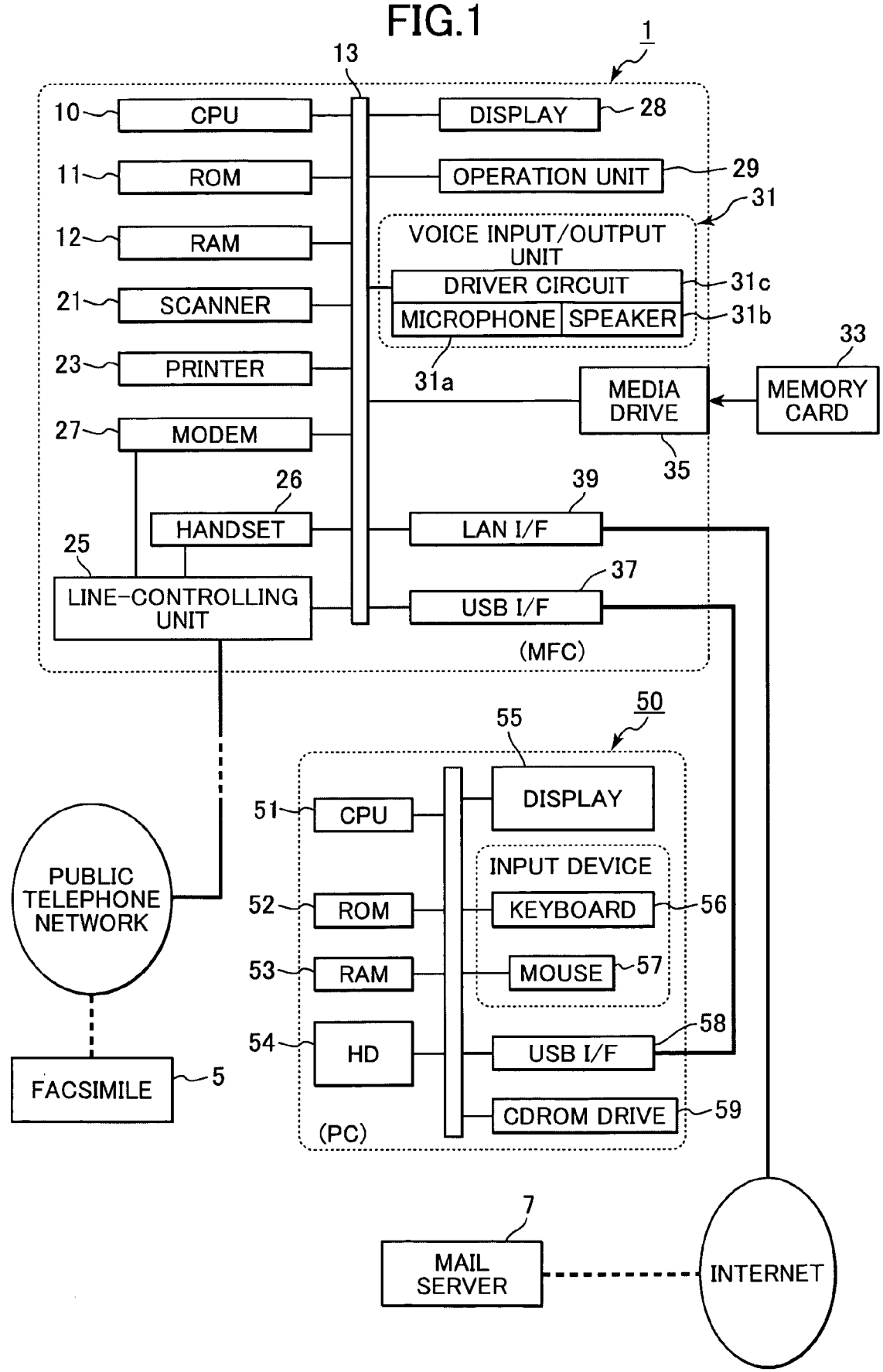
FIG. 1 is a block diagram showing structures of a digital multifunction device and a personal computer to which the present invention is applied.

Next, a preferred embodiment of the present invention will be described with reference to the drawings. FIG. 1 shows the constructions of a digital multifunction device (MFC) 1 serving as the facsimile machine to which the present invention is applied and a personal computer (PC) 50 serving as the terminal device.

The digital multifunction device 1 includes a CPU 10 for performing comprehensive control of the device, and memory (a ROM 11 and a RAM 12) for storing programs, data, and the like required for operations by the CPU 10. The CPU 10 controls various components of the device, such as a scanning unit 21, a printing unit 23, and a line-controlling unit 25, via a bus 13 in order to implement a facsimile function, a printer function, a copier function, and the like.

The scanning unit 21 scans image content from an original document for fax transmissions (that is, the transmission of facsimile data), copying, and the like. The scanning unit 21 acquires an original document on which an image of text, graphics, or the like is formed from a paper supply tray (not shown) of the digital multifunction device 1. The scanning unit 21 then optically scans the image from the original and generates image data as the scanning results.

The printing unit 23 functions as an image forming unit for forming (printing) color images or monochrome images on a recording paper. The printing unit 23 forms images based on image data on the recording paper when image data for printing is inputted from an external source.

The line-controlling unit 25 performs such processes as transmitting dial signals to a public telephone network and responding to call signals from the public telephone network. The line-controlling unit 25 is connected to the public telephone network, serving as the external network, via telephone lines installed in the building and transmits and receives facsimile data, voice communications, and the like between an external communication terminal (a facsimile machine 5, a telephone terminal, and the like) via this public telephone network.

Further, a modem 27 connected to the line-controlling unit 25 functions to convert facsimile data to communication signals to be transmitted via the public telephone network and extracts facsimile data by demodulating signals received from the public telephone network. In addition, a handset 26 is connected to the line-controlling unit 25 to enable voice communications in the digital multifunction device 1 with an external telephone terminal.

The digital multifunction device 1 also includes a liquid crystal display 28, an operation unit 29 including a plurality of operating keys, and the like. When various commands are inputted through user operations on the operation unit 29, the CPU 10 executes processes corresponding to the type of command.

For example, if a fax transmission command is inputted from the operation unit 29, the digital multifunction device 1 generates facsimile data by optically scanning an image from the original document using the scanning unit 21. Subsequently, the digital multifunction device 1 transmits the generated facsimile data to the external facsimile machine 5 connected to the public telephone network via the modem 27 and the line-controlling unit 25. Further, when facsimile data is received from the facsimile machine 5, the digital multifunction device 1 acquires the facsimile data via the line-controlling unit 25 and the modem 27 and controls the printing unit 23 to form an image based on the facsimile data (facsimile function).

When a copy command is inputted from the operation unit 29, the digital multifunction device 1 scans the image from the original using the scanning unit 21, inputs this image data into the printing unit 23, and controls the printing unit 23 to form an image on recording paper based on this image data (copier function).

The digital multifunction device 1 also includes a voice input/output unit 31 for implementing a hands-free function. The voice input/output unit 31 includes a microphone 31*a*, a speaker 31*b*, and a drive circuit 31*c* for driving the microphone 31*a* and speaker 31*b*. The digital multifunction device 1 also includes a media drive 35 for reading various data from and writing various data to a memory card 33, such as a Compact Flash (registered trademark) card or the like.

The digital multifunction device 1 also includes a USB (universal serial bus) interface 37 and a LAN (local area network) interface 39. When image data is received from the external personal computer 50 via the USB interface 37 or from a personal computer connected to a LAN or the Internet via the LAN interface 39, the digital multifunction device 1 directs the printing unit 23 to form images based on this image data on recording paper (printer function).

The digital multifunction device 1 has a virtual drive function that enables the personal computer 50 connected to the USB interface 37 to recognize an area of the RAM 12 (a virtual drive area 12*d* described later) as an external storage device and allows the personal computer 50 to access this area.

Figure 2A:
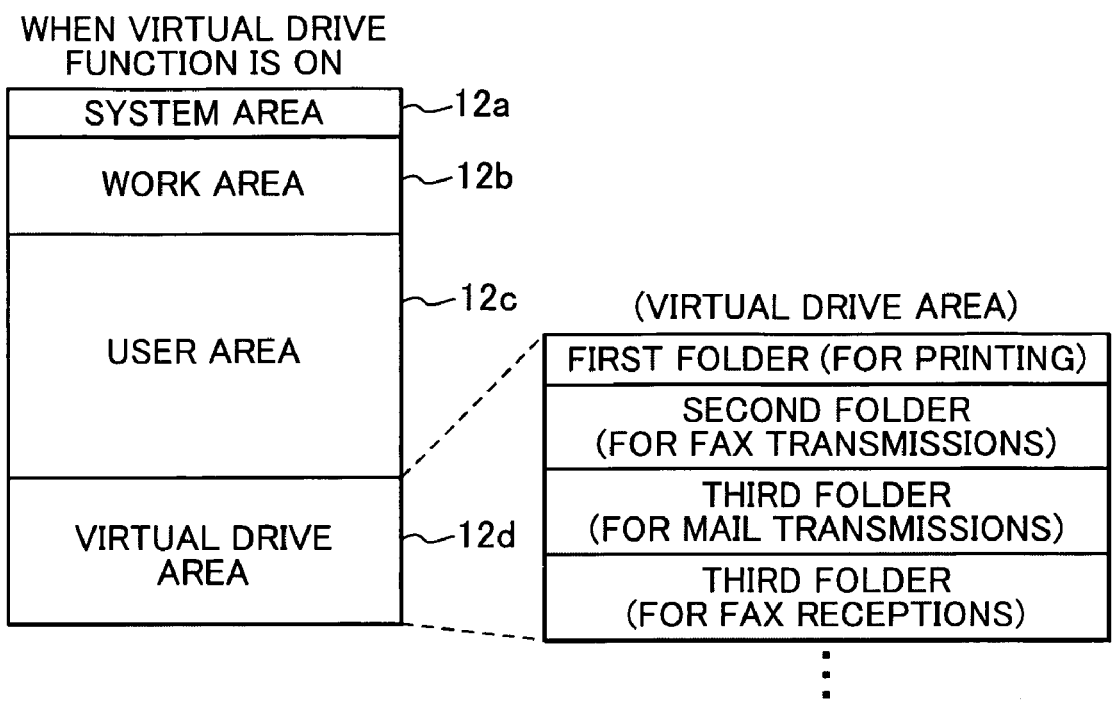
Figure 2B:
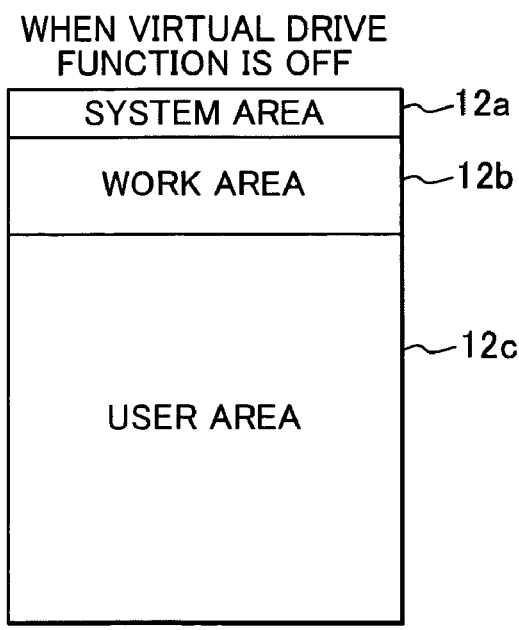
FIG. 2(b) is an explanatory diagram showing a structure of a RAM 12 when virtual drive function is off.

The RAM 12 is configured primarily of a system area 12*a*, a work area 12*b*, a user area 12*c*, and a virtual drive area 12*d*. FIG. 2(*a*) is an explanatory diagram showing the structure in the RAM 12 when the virtual drive function is rendered ON. FIG. 2(*b*) is an explanatory diagram showing the structure in the RAM 12 when the virtual drive function is rendered OFF.

The system area 12*a* is a memory space provided for executing programs for the primary management and operations of the digital multifunction device 1. The work area 12*b* is a memory space used for executing various functions possessed by the digital multifunction device 1. The user area 12*c* is a memory space for temporarily storing image data such as facsimile data acquired from an external source via the line-controlling unit 25, the USB interface 37, the LAN interface 39, and the like. The virtual drive area 12*d* is a memory space that the personal computer 50 can recognize as an external storage device.

The virtual drive area 12*d* is created only when the virtual drive function is on. The memory space corresponding to the virtual drive area 12*d* is used as the user area 12*c* while the virtual drive function is off. The virtual drive area 12*d* has a tree-like folder structure (called a directory), in which folders and data files are sorted and stored.

Figure 3:
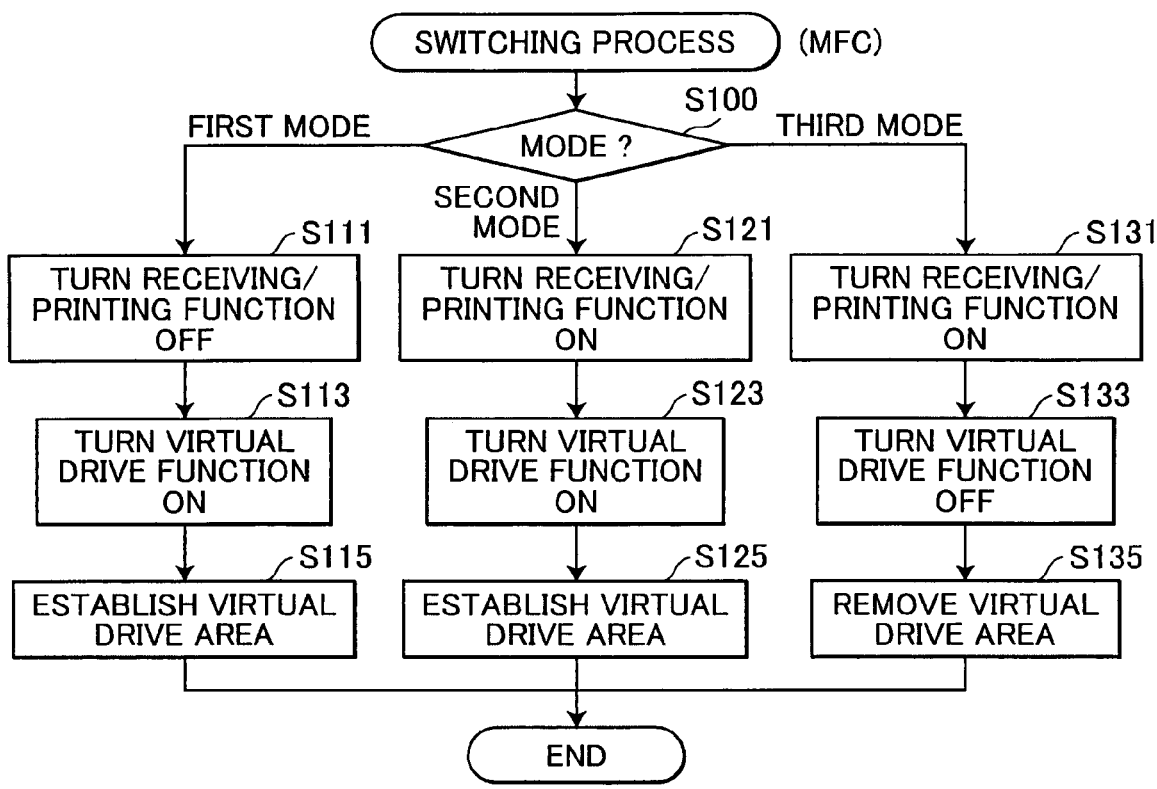
FIG. 3 is a flowchart showing steps in a switching process executed by a CPU in the digital multifunction device.
Figure 4:
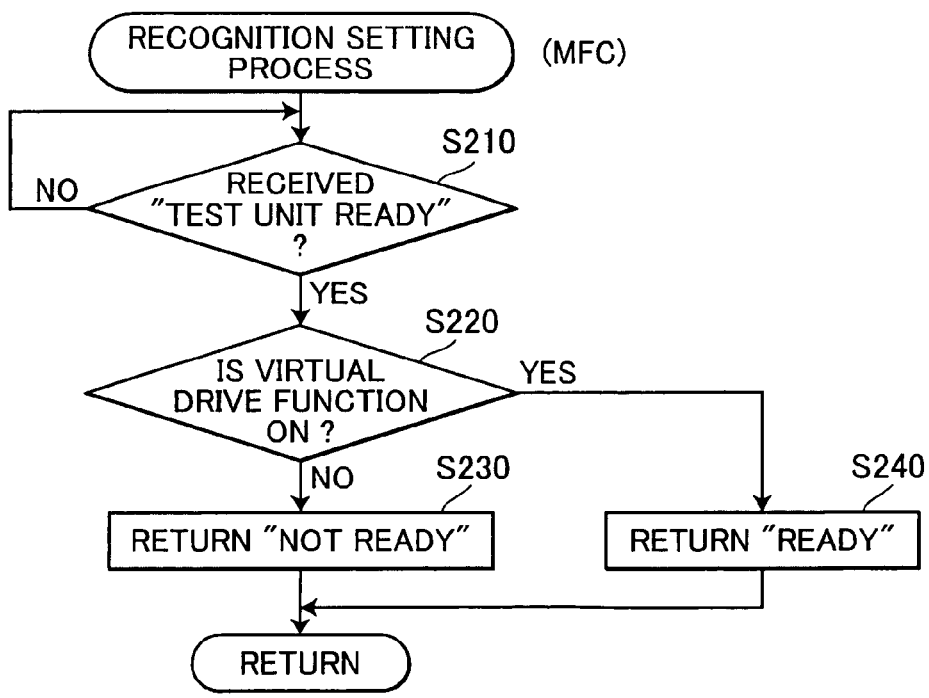
FIG. 4 is a flowchart showing steps in a recognition setting process executed by the CPU.

Switching the virtual drive function (ON/OFF) is implemented in a switching process shown in FIG. 3 and a recognition setting process shown in FIG. 4. FIG. 3 is a flowchart showing the switching process executed by the CPU 10 when a switch command is inputted from the operation unit 29. In FIG. 3, a first mode implies an operation mode in which received facsimile data is not recorded but the facsimile data is transferred to the PC, a second mode implies an operation mode in which the received facsimile data is recorded, and the facsimile data is transferred to the PC. A third mode is an operation mode in which the received facsimile data is recorded but the facsimile data is not transferred to PC. FIG. 4 is a flowchart showing the recognition setting process repeatedly executed by the CPU 10 at all times.

When a switch command is inputted from the operation unit 29, the CPU 10 determines which mode is indicated by the switch command, among a first mode through a third mode (S100). If the switch command is determined to be a command for switching to the first mode, then the CPU 10 sets the receiving/printing function for facsimile data to OFF (S111) and sets the virtual drive function to ON (S113). Here, the receiving/printing function for facsimile data is a function for quickly and automatically printing facsimile data received from an external source via the line-controlling unit 25, without prompting the user for printing confirmation.

When the process in S113 ends, the CPU 10 creates the virtual drive area 12d in the RAM 12 and creates a plurality of folders in the virtual drive area 12d for sorting and storing various data (S115). Specifically, the CPU 10 in the preferred embodiment creates a first folder for storing image data for printing, a second folder for storing image data for fax transmissions, a third folder for storing image data for e-mail transmissions, and a fourth folder for storing facsimile data received via the line-controlling unit 25. After the plurality of folders has been created, the CPU 10 ends the process.

However, if the switch command is determined to be a command for switching to the second mode in S100, the CPU 10 sets the receiving/printing function for facsimile data to ON (S121) and sets the virtual drive function to ON (S123). In S125 the CPU 10 creates the virtual drive area 12d in the RAM 12 and creates the plurality of folders in the virtual drive area 12d. If the virtual drive area 12d has already been created, the process of S125 is skipped. Subsequently, the CPU 10 ends the switching process.

Further, if the switch command is determined in S100 to be a command for switching to the third mode, then the CPU 10 sets the receiving/printing function for facsimile data to ON (S131) and sets the virtual drive function to OFF (S133). Subsequently, the CPU 10 clears the virtual drive area 12d allocated in the RAM 12 and assigns this memory space to the user area 12c (S135). Subsequently, the CPU 10 ends the switching process.

Next, the recognition setting process (see FIG. 4) will be described. When the recognition setting process is executed, the CPU 10 waits until inquiry signals for confirming operations related to the USB device are transmitted from the personal computer 50 (S210).

Specifically, Windows (registered trademark) and other operating systems are configured to transmit a "TEST UNIT READY" command from a USB interface 58 at intervals of several seconds as an inquiry signal for confirming operations related to the USB device. If the CPU 10 determines that the "TEST UNIT READY" command has been transmitted from the personal computer 50 via the USB interfaces 58 and 37 (S210: YES), the CPU 10 makes judgment as to whether or not the virtual drive function is on (S220).

If the CPU 10 determines that the virtual drive function is off (S220: NO), then the CPU 10 prevents the personal computer 50 from recognizing the virtual drive area 12d in the RAM 12 as an external storage device by transmitting a "NOT READY" command to the personal computer 50 via the USB interface 37 indicating that the virtual drive is not ready to operate (S230).

However, if the CPU 10 determines that the virtual drive function is on (S220: YES), then the CPU 10 enables the personal computer 50 to recognize the virtual drive area 12d as an external storage device by transmitting a "READY" command to the personal computer 50 via the USB interface 37 indicating that the virtual drive is ready for operations (S240). After completing this process, the CPU 10 ends the recognition setting process.

Figure 5:
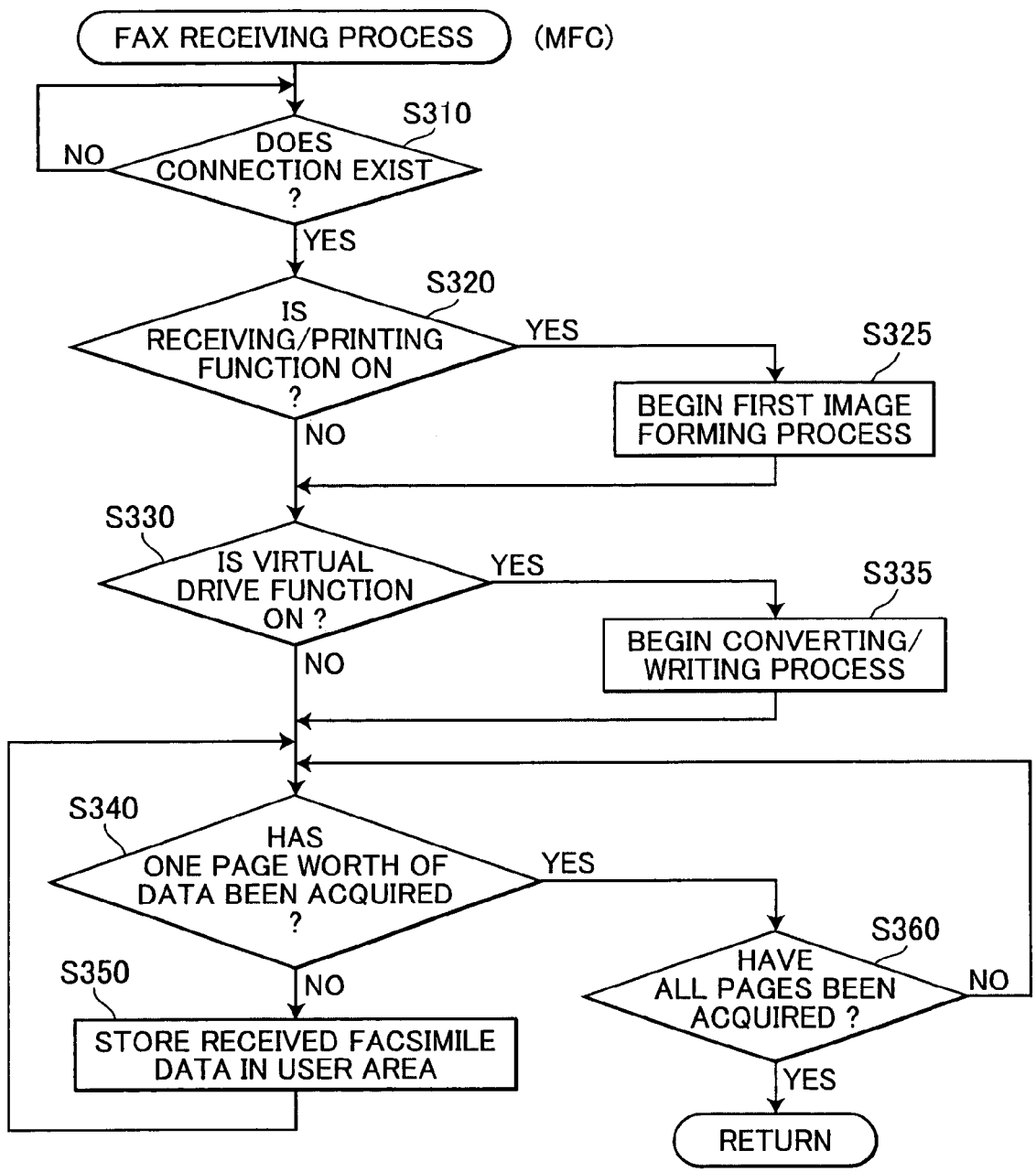
FIG. 5 is a flowchart showing steps in a fax receiving process executed by the CPU.

Next, a fax receiving process executed by the digital multifunction device 1 will be described. FIG. 5 is a flowchart showing the fax receiving process that is repeatedly executed by the CPU 10.

At the beginning of the fax receiving process, the CPU 10 waits until a connection is established from the facsimile machine 5 to the line-controlling unit 25 via the public telephone network (S310). When a connection is established from the facsimile machine 5 to the line-controlling unit 25 (S310: YES), then in S320 the CPU 10 determines whether the receiving/printing function is on.

If the CPU 10 determines that the receiving/printing function is on (S320: YES), then the CPU 10 begins executing a first image forming process shown in FIG. 6 (S325) and advances to the process in S330. However, if the CPU 10 determines that the receiving/printing function is off (S320: NO), then the CPU 10 advances to S330 without executing the first image forming process.

In S330, the CPU 10 determines whether the virtual drive function is on. If the CPU 10 determines that the virtual drive function is on (S330: YES), then the CPU 10 begins executing a converting/writing process shown in FIG. 7 (S335) and subsequently advances to the process of S340. However, if the CPU 10 determines that the virtual drive function is off (S330: NO), then the CPU 10 advances to S340 without executing the converting/writing process.

In S340, the CPU 10 determines whether one page worth of facsimile data transmitted from the external facsimile machine 5 via the line-controlling unit 25 and the modem 27 has been acquired. If one page worth of data has not been acquired (S340: NO), then the CPU 10 acquires the facsimile data from the modem 27 and writes this data to the user area 12c (S350) until one page worth of facsimile data has been acquired (until a YES determination in S340).

When one page of worth of facsimile data has been written to the user area 12c, the CPU 10 determines YES in S340 and in S360 determines whether all pages of the facsimile data have been acquired (in other words, whether the facsimile machine 5 has completed transmission of the facsimile data).

If all pages of the facsimile data have not been acquired at this time (S360: NO), then the CPU 10 returns to S340, acquires the next page of facsimile data from the modem 27, and writes this data to the user area 12c.

However, if the CPU 10 determines in S360 that all pages of facsimile data have been acquired (S360: YES), then the fax receiving process ends.

Figure 6:
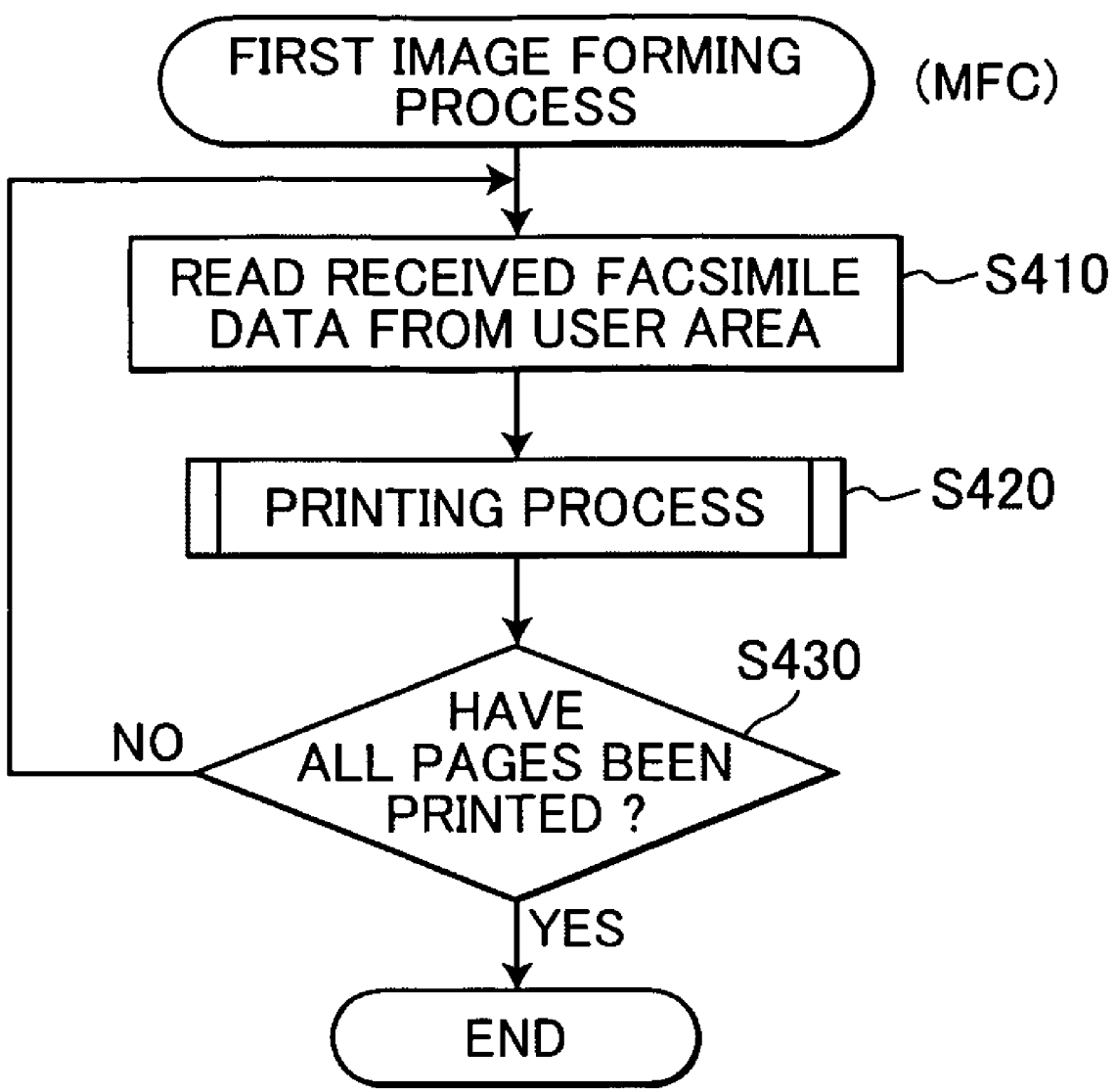
FIG. 6 is a flowchart showing steps in a first image forming process executed by the CPU.

Next, the first image forming process initiated in S325 will be described. FIG. 6 is a flowchart showing the first image forming process that the CPU 10 executes in parallel with the fax receiving process.

When execution of the first image forming process is begun, the CPU 10 reads the facsimile data written to the user area 12c in the fax receiving process from the user area 12c (S410). The data may be read after one page worth of facsimile data has been written in the fax receiving process or after a plurality of pages worth of facsimile data has been written. The facsimile data may also be read without waiting for one page worth of facsimile data to be written.

After reading the facsimile data, the CPU 10 inputs the data into the printing unit 23 and controls the printing unit 23 to form (print) images based on this facsimile data on recording paper (S420).

Subsequently, the CPU 10 determines whether all pages of the facsimile data have been printed (S430). If the CPU 10 determines that the printing is not complete (S430: NO), then the CPU 10 continues reading facsimile data from the user area 12c that was written in the fax receiving process (S410) and executes the above printing process (S420). After all pages of the facsimile data have been printed (S430: YES), the first image forming process ends.

Figure 7:
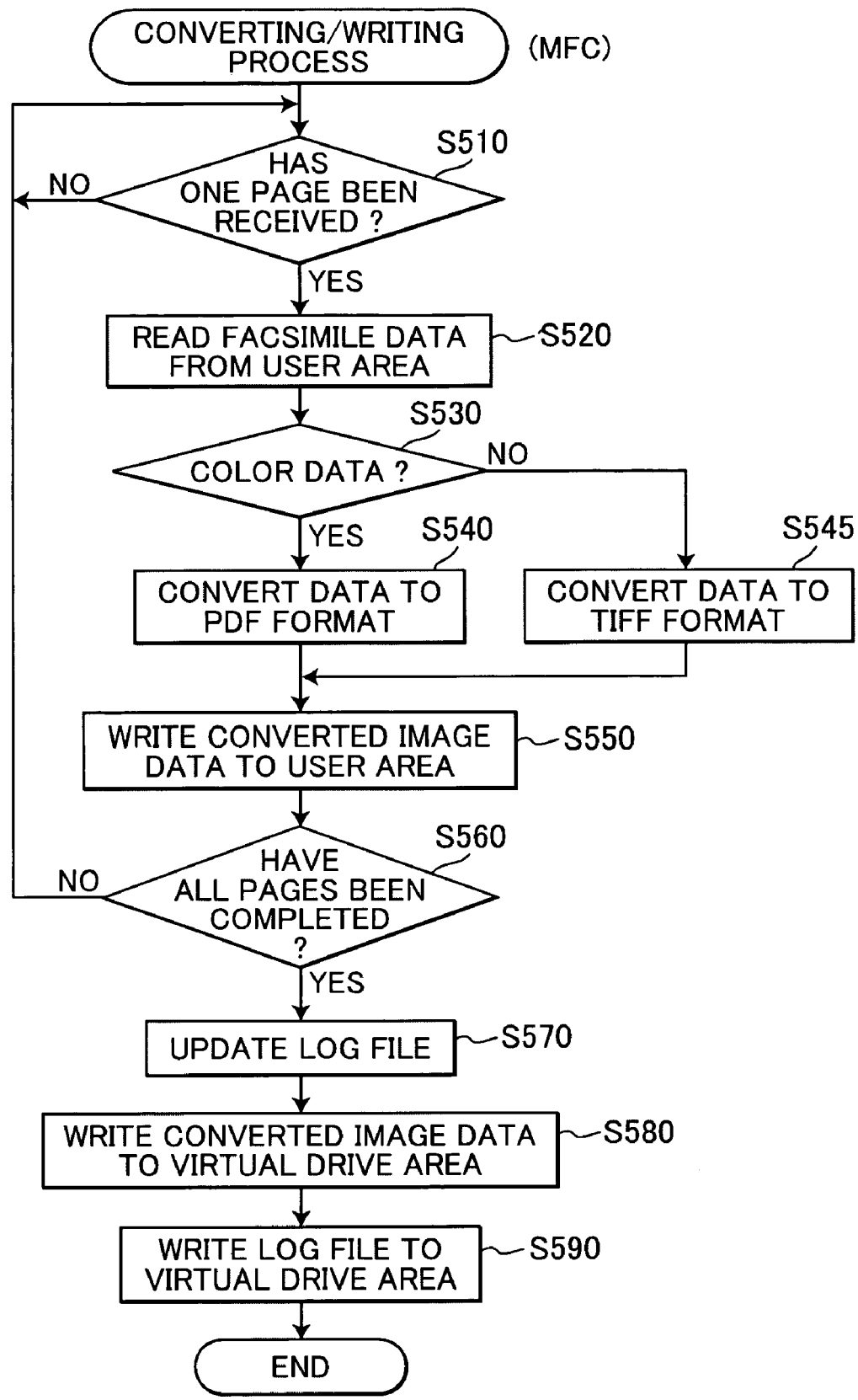
FIG. 7 is a flowchart showing steps in a converting/writing process executed by the CPU.

Next, the converting/writing process initiated in S335 will be described. FIG. 7 is a flowchart showing the converting/writing process that the CPU 10 executes in parallel with the fax receiving process.

When execution of the converting/writing process is begun, the CPU 10 waits until one page worth of facsimile data has been received and until this data has been written to the user area 12c (S510). After one page worth of facsimile data has been written to the user area 12c, the CPU 10 determines YES in S510 and reads this facsimile data from the user area 12c (S520).

Subsequently, the CPU 10 determines whether the facsimile data is color image data or monochrome image data (S530). If the CPU 10 determines that the facsimile data is color image data (S530: YES), then the CPU 10 converts the facsimile data to image data in the portable document format (PDF; S540).

Since facsimile data is generally encoded by the Modified Huffman (MH) method, in S540 the CPU 10 converts the image data in MH format to image data in PDF format, which is an image format that can be used by the personal computer 50 and in which data describing the arrangement of a plurality of pages can be embedded.

However, if the CPU 10 determines in S530 that the facsimile data is monochrome image data (S530: NO), then the CPU 10 converts the facsimile data to image data in tagged image file format (TIFF), which is an image format that can be used by the personal computer 50 and in which data describing the arrangement of a plurality of pages can be embedded (S545). Image data in the TIFF format stores data (tags) describing the arrangement of the plurality of pages and the image data for each page.

After the image data has been converted in this way, the CPU 10 writes the image data in the PDF format or the TIFF format that has been converted above to the user area 12c (S550).

Subsequently, the CPU 10 determines whether all pages of the facsimile data have been converted to image data (S560). If the CPU 10 determines that not all pages have been converted (S560: NO), then the CPU 10 returns to S510, reads the next page of facsimile data from the user area 12c (S520), and converts this data to the PDF or TIFF format (S540 or S545). At this time, this next page of image data is combined with the previous page of image data to form a single image data (image data in the PDF or TIFF format). Next, the CPU 10 writes the converted image data to the user area 12c (S550).

When the CPU 10 determines that all pages of data have been converted (S560: YES), then the CPU 10 generates communication history data for the facsimile data just received. The CPU 10 updates the log file by writing this communication history data thereto (S570).

FIG. 8 is an explanatory diagram showing the structure of the log file. The log file stores data in the comma separated values (CSV) format, which is very versatile and compatible with the personal computer 50. This log file is stored in the work area 12b.

The CPU 10 generates communication history data based on results of receiving facsimile data from the line-controlling unit 25 and modem 27 and appends this data in the log file. The communication history data includes data regarding the reception date, reception time, type of communication, transmission source, length of communication, number of received pages, type of communication result, and filename of the received data. This log file is updated each time facsimile data is received. Therefore the log file stores communication history data for a plurality of communications.

Communication history data is written to the log file not only when facsimile data is received, but also when facsimile data is transmitted. Communication history data for facsimile transmissions includes data related to the transmission date, transmission time, type of communication, transmission destination, length of communication, number of transmitted pages, type of communication result, and filename of the transmitted data. Data related to the type of communication described above is used to differentiate communications of different types. For example, the characters "Rx" are attached to the communication history data for received faxes (when receiving facsimile data) as data representing the type of communication, while the characters "Tx" are attached to the communication history data for transmitted faxes. The type of communication result is data representing whether the communication was performed normally. If the communication concluded normally, the characters "OK" are added to the log file.

After updating the log file, in S580 the CPU 10 writes the converted image data to the fourth folder in the virtual drive area 12d. In S590 the CPU 10 writes the updated log file to the virtual drive area 12d, and subsequently ends the converting/writing process.

The operations of the digital multifunction device 1 were described above for a fax reception. When the personal computer 50 writes image data to the virtual drive area 12d while the virtual drive function is on, the digital multifunction device 1 reads this image data from the virtual drive area 12d and performs a prescribed process on the image data, such as a printing process, a fax transmitting process, or a mail transmitting process.

Figure 9:
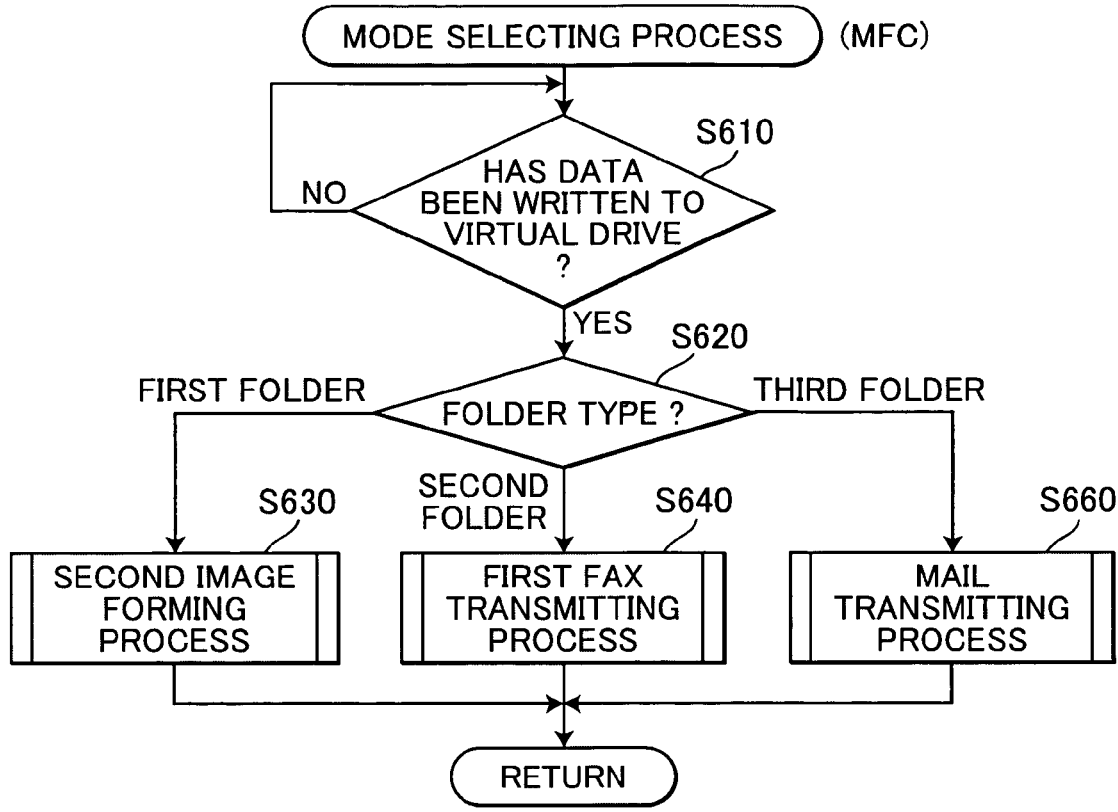
FIG. 9 is a flowchart showing steps in a mode selecting process executed by the CPU.

Next, the process executed by the CPU 10 when image data is written from the personal computer 50 into the virtual drive area 12d will be described. The CPU 10 selects one of a plurality of process modes according to the type of folder in which the image data has been written and executes a prescribed process corresponding to that mode on the image data. FIG. 9 is a flowchart showing a mode selecting process that the CPU 10 repeatedly executes at all times when the virtual drive function is on.

When executing the mode selecting process, the CPU 10 determines whether the personal computer 50 has written data to the virtual drive area 12d via the USB interface 37 (S610). If the CPU 10 determines that data has been written, then the CPU 10 determines to which of the first through third folders provided in the virtual drive area 12d the data has been written (S620).

Figure 10:
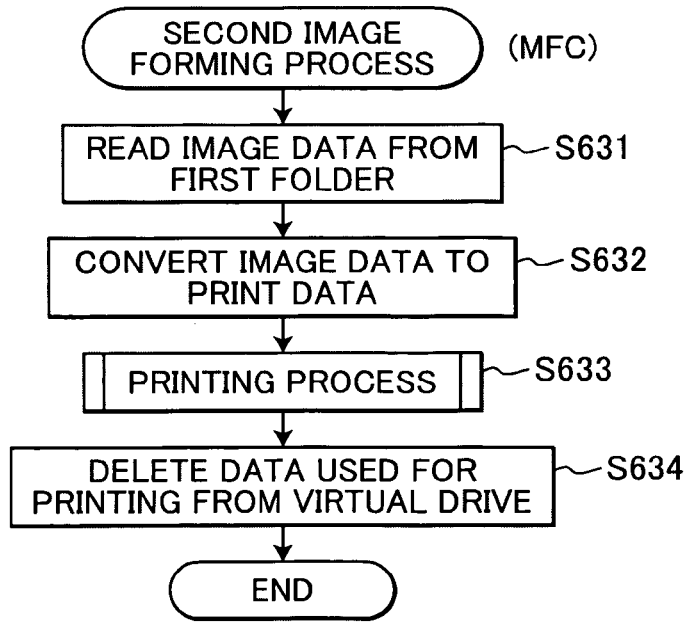
FIG. 10 is a flowchart showing steps in a second image forming process executed by the CPU.

If the CPU 10 determines that data has been written to the first folder, then the CPU 10 advances to the process of S630 and executes a second image forming process shown in FIG. 10. After completing the second image forming process, the mode selecting process ends.

FIG. 10 is a flowchart showing the second image forming process executed by the CPU 10. When the second image forming process is executed, the CPU 10 reads image data stored in the first folder of the virtual drive area 12d (S631). Next, the CPU 10 converts this image data into print data with which the printing unit 23 can form images (S632). The CPU 10 inputs this print data into the printing unit 23 and controls the printing unit 23 to form images on recording paper based on the print data (S633: printing process). After the printing is complete, the CPU 10 deletes the image data used for printing from the virtual drive area 12d (S634) and ends the second image forming process.

Figure 11:
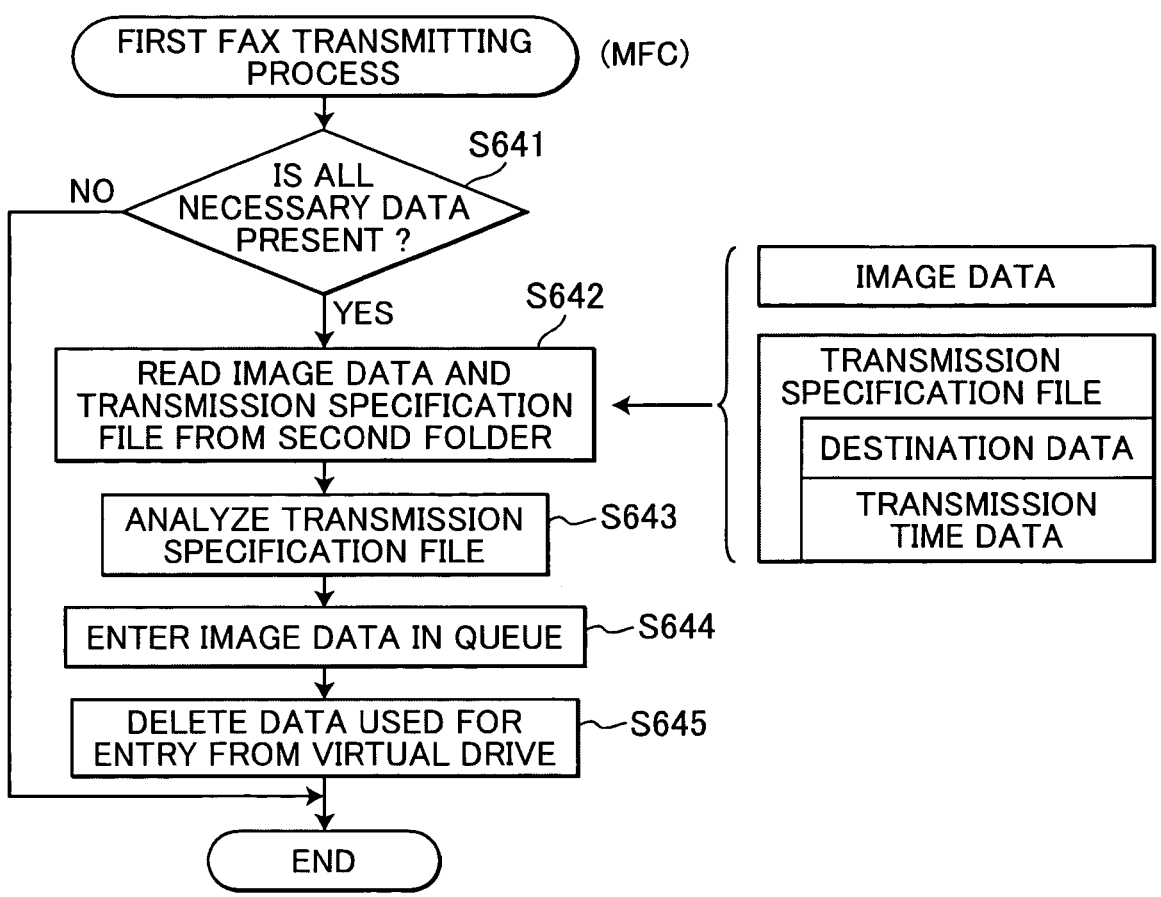
FIG. 11 is a flowchart showing steps in a first fax transmitting process executed by the CPU.

However, if the CPU 10 determines that data has been written to the second folder in S620, then the CPU 10 executes a first fax transmitting process shown in FIG. 11 (S640). After completing the first fax transmitting process, the CPU 10 ends the mode selecting process.

FIG. 11 is a flowchart showing the first fax transmitting process executed by the CPU 10. When the first fax transmitting process is executed, the CPU 10 determines whether all data required for the fax transmission has been stored together in the second folder (S641). Data required for the fax transmission includes image data for transmission (facsimile data) and a transmission specification file storing destination data and transmission time data. If all required data is not present (S641: NO), then the CPU 10 immediately ends the first fax transmitting process.

However, if all necessary data is stored in the second folder (S641: YES), then the CPU 10 reads the image data and transmission specification file attached to the image data from the second folder (S642). Subsequently, the CPU 10 analyzes the transmission specification file and determines the transmission destination and the transmission time for the image data (facsimile data; S643). Here, the destination data stored in the transmission specification file is transmission destination data representing a telephone number or the like of the transmission destination. The transmission time data stored in the file is data representing the time of transmission (date, hour, minute, etc.).

Next, the CPU 10 enters the image data (facsimile data) together with the transmission destination data and the transmission time data in a queue (S644). After entering the data in the queue, the CPU 10 deletes the image data for this entry and the transmission specification file corresponding to the image data from the virtual drive area 12d (S645) and ends the first fax transmitting process.

Figure 12:
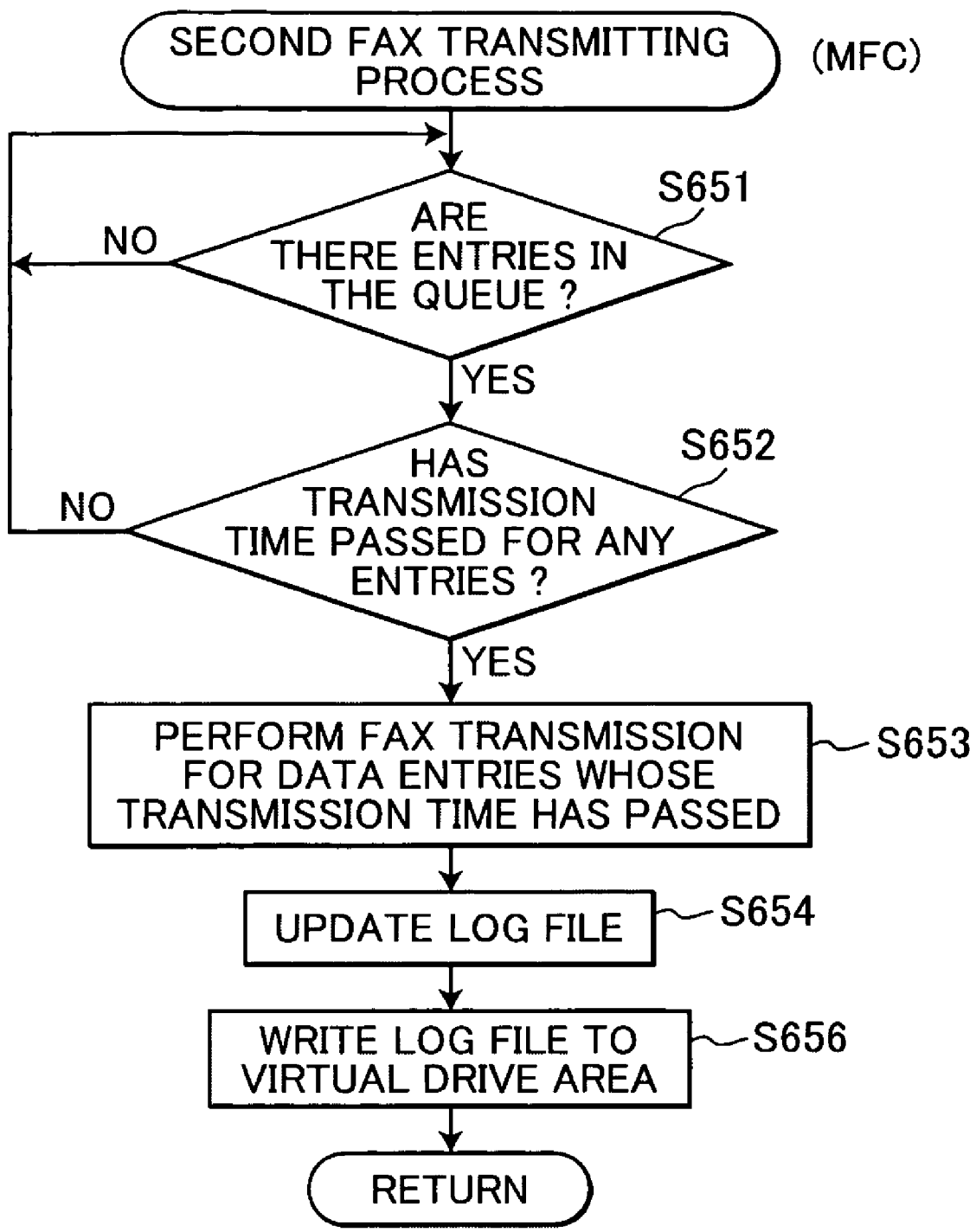
FIG. 12 is a flowchart showing steps in a second fax transmitting process executed by the CPU.

The facsimile data entered in the queue is transmitted to the facsimile machine 5 at the specified destination during a second fax transmitting process shown in FIG. 12. FIG. 12 is a flowchart showing the second fax transmitting process that the CPU 10 repeatedly executes at all times.

When the second fax transmitting process is executed, the CPU 10 determines whether facsimile data is entered in the queue (S651). If the CPU 10 determines that facsimile data has not been entered in the queue (S651: NO), then the CPU 10 waits until facsimile data has been entered in the queue.

However, when the CPU, 10 determines that facsimile data is entered in the queue (S651: YES), then the CPU 10 determines whether the transmission time for the facsimile data has passed based on the transmission time data entered in the queue with the facsimile data (S652). If the CPU 10 determines that the transmission time has passed (S652: YES), then the CPU 10 transmits the facsimile data for which the transmission time has passed via the line-controlling unit 25 to the facsimile machine 5 at the destination specified in the first fax transmitting process based on the destination data (that is, the destination corresponding to the transmission destination data; S653).

Subsequently, the CPU 10 deletes the facsimile data for transmission from the queue, generates the above-described communication history data based on the transmission results of the line-controlling unit 25, and updates the log file by writing this data thereto (S654). Next, the CPU 10 writes the log file to the virtual drive area 12d (S656) and ends the second fax transmitting process.

Figure 13:
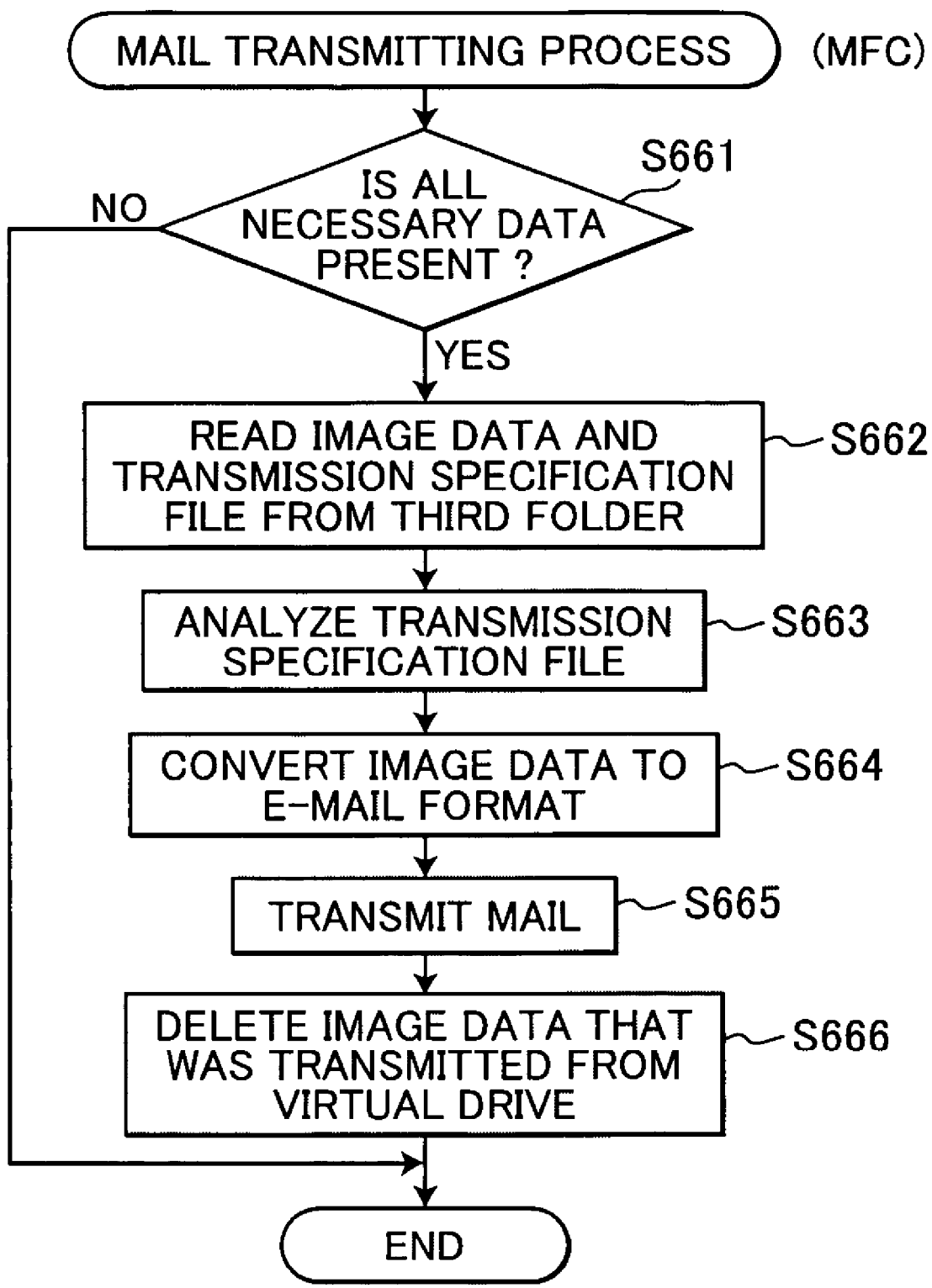
FIG. 13 is a flowchart showing steps in a mail transmitting process executed by the CPU.

Further, if the CPU 10 determines that data has been written to the third folder in S620 of the mode selecting process, the CPU 10 executes a mail transmitting process shown in FIG. 13 (S660). After completing the mail transmitting process, the CPU 10 ends the mode selecting process. FIG. 13 is a flowchart showing the mail transmitting process executed by the CPU 10.

When execution of the mail transmitting process begins, the CPU 10 determines whether data required for transmitting e-mail has been stored in the third folder (S661). Data required for transmitting e-mail in the preferred embodiment includes image data attached to the e-mail and a transmission specification file including destination data and the like. If the CPU 10 determines that this required data is not present (S661: NO), the CPU 10 immediately ends the mail transmitting process.

However, if the CPU 10 determines that all required data is present in the third folder (S661: YES), then the CPU 10 reads the image data and the transmission specification file attached to the image data from the third folder (S662). Next, the CPU 10 analyzes the transmission specification file, determines the transmission destination of the e-mail, and sets the transmission destination for the e-mail (S663). The transmission specification file includes data representing an e-mail address or the like as the destination data indicating the transmission destination.

Subsequently, the CPU 10 converts the image data to data in an e-mail format (S664) and transmits this image data in the e-mail format to the destination represented by the destination data in the transmission specification file via the LAN interface 39 and a mail (SMTP) server 7 on the Internet (S665). Further, the CPU 10 deletes the image data used for the transmission and the transmission specification file corresponding to this image data from the virtual drive area 12d (S666) and ends the mail transmitting process.

While the construction of the digital multifunction device 1 according to the preferred embodiment has been described above, the construction and operations of the personal computer 50 connected to and in communication with the digital multifunction device 1 via the USB interface 37 will be described next.

The personal computer 50 of the preferred embodiment is well known in the art and includes a CPU 51, a ROM 52, a RAM 53, a hard disk 54, a display 55, a keyboard 56, a mouse 57, the USB interface 58, and a CD-ROM drive 59. The personal computer 50 is operated by an operating system such as Windows (registered trademark) having a Plug and Play function supporting USB.

A USB device (the digital multifunction device 1) connected to the USB interface 58 is detected and automatically recognized by the Plug and Play function provided in the operating system of the personal computer 50. Specifically, the virtual drive area 12d of the digital multifunction device 1 is recognized by the Plug and Play function of the OS as an external storage device to the personal computer 50.

Programs for directing the CPU 51 to execute a data reading process and a terminal fax transmitting process described later can be optionally installed on the personal computer 50 by the user.

The program for the data reading process functions to manage various data stored in the virtual drive area 12d of the digital multifunction device 1. When this program is installed on the personal computer 50, the personal computer 50 functions as the data management device.

Figure 14:
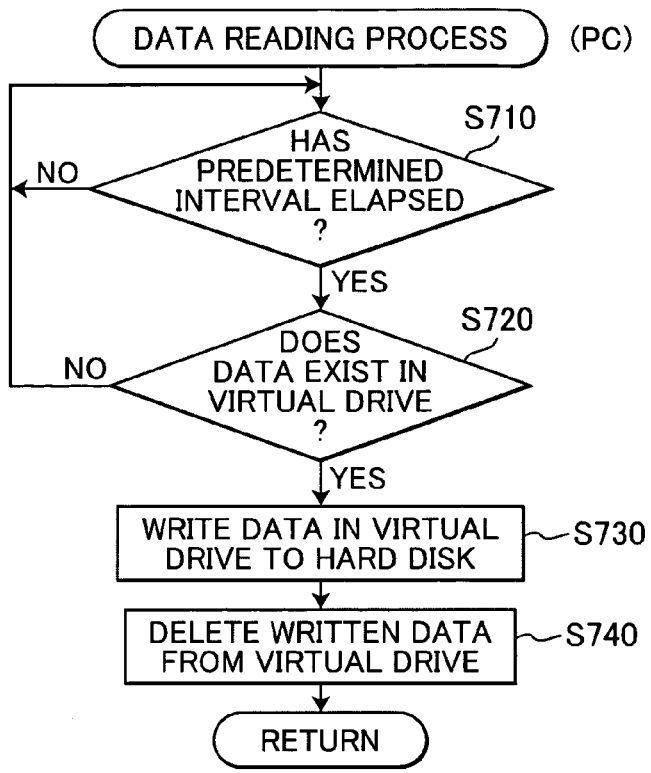
FIG. 14 is a flowchart showing steps in a data reading process executed by a CPU in a personal computer as a terminal device connected to the digital multifunction device.

FIG. 14 is a flowchart showing the data reading process executed by the CPU 51 of the personal computer 50. The CPU 51 repeatedly executes this data reading process at all times.

When the data reading process is executed, the CPU 51 waits until a predetermined interval has elapsed (S710). After the predetermined interval has elapsed (S710: YES), in S720 the CPU 51 determines whether image data has been written to the fourth folder in the virtual drive area 12d. If the CPU 51 determines that image data has not been written to the fourth folder (S720: NO), then the CPU 51 returns to S710 and again waits for the predetermined interval to elapse.

However, if the CPU 51 determines that image data has been written to the fourth folder (S720: YES), then the CPU 51 advances to S730 and writes the data in the fourth folder on the hard disk 54 provided in the personal computer 50 as a nonvolatile storage medium. At this time, the image data is written to a prescribed folder on the hard disk 54 that has been preset by the user (S730). If the writing concludes normally, the CPU 51 deletes the data in the fourth folder from the virtual drive area 12*d* (S740). Subsequently, the data reading process ends.

By this data reading process, image data in the virtual drive area that will be lost when the power is turned off can be transferred to a non-volatile storage medium. Accordingly, the user can easily see past image data (facsimile data) received by the digital multifunction device 1 at a later date on the display 55 of the personal computer 50.

Figure 15:
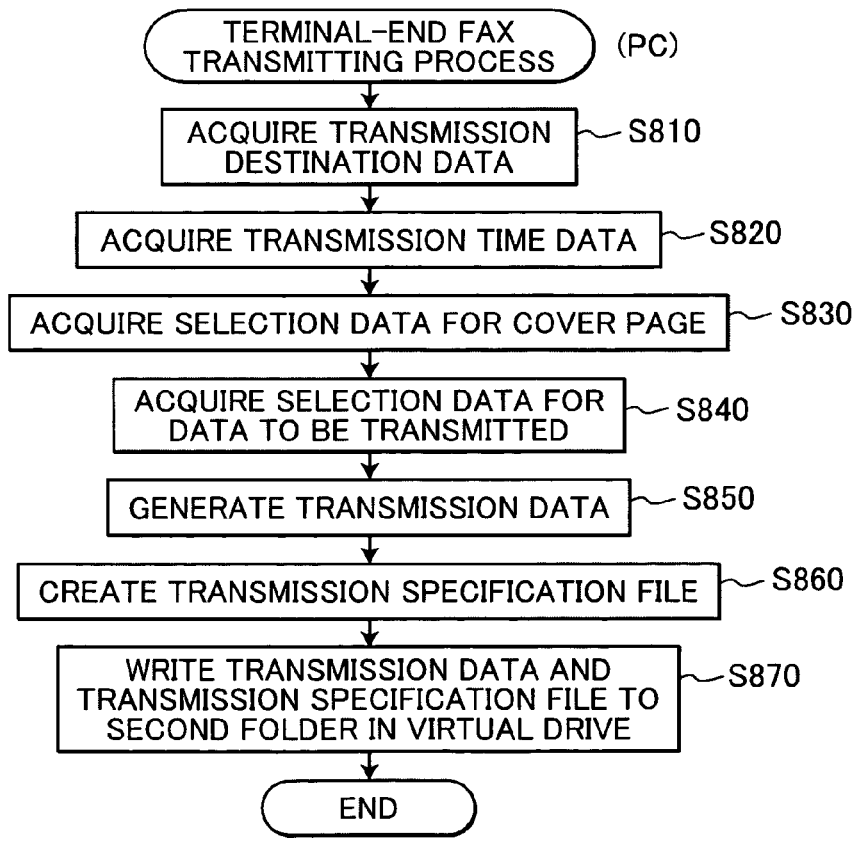
FIG. 15 is a flowchart showing steps in a terminal-end fax transmitting process executed by the CPU of the personal computer.

A program for a terminal-end fax transmitting process is designed for using the fax transmission function provided by the digital multifunction device 1 on the personal computer 50 end. FIG. 15 is a flowchart showing the terminal-end fax transmitting process executed by the CPU 51 when the user operates an input device such as the keyboard 56 or the mouse 57 to input a fax transmission command into the CPU 51.

At the beginning of the terminal-end fax transmitting process, the CPU 51 displays a dialog box on the display 55 of the personal computer 50, prompting the user for the transmission destination of the facsimile data and subsequently acquires transmission destination data from the facsimile data upon manipulation of the input device (S810).

Next, the CPU 51 displays a dialog box on the display 55 prompting the user to input the transmission time for the facsimile data and subsequently acquires transmission time data for the facsimile data via the input device (S820).

Next, the CPU 51 displays a dialog box on the display 55 prompting the user to select a cover page to be attached as the first page and subsequently acquires selection data for a cover page via the input device (S830). The data for the cover page is stored on the hard disk 54 of the personal computer 50.

The CPU 51 further displays a dialog box on the display 55, prompting the user to specify image data to be transmitted as the facsimile data and subsequently acquires selection data (the filename for the image data or the like) for the image data to be transmitted via the input device (S840).

Next, the CPU 51 reads the image data to be transmitted, which image data is stored on the hard disk 54, according to the cover page selection data acquired in S830 and the transmission data selection data acquired in S840. Thus, the CPU 51 generates transmission data (facsimile data) in S850. That is, the CPU 51 converts this image data to the MH format and attaches image data of the cover page to the image data as the top page.

The CPU 51 creates a transmission specification file (see FIG. 11) including the destination data and the transmission time data based on the transmission destination data and transmission time data acquired in S810 and S820 (S860).

Next, the CPU 51 writes the transmission data (facsimile data) generated above and the transmission specification file to the second folder in the virtual drive area 12*d* (S870) and ends the terminal-end fax transmitting process. The digital multifunction device 1 processes the transmission data and transmission specification file by means of the first fax transmitting process of FIG. 11.

To this point, a description has been given for the digital multifunction device 1 and the personal computer 50 of the preferred embodiment. According to the digital multifunction device 1, the CPU 10 enables the personal computer 50 to recognize the virtual drive area 12*d* in the RAM 12 as an external storage device in S240 of the recognition setting process. Hence, the personal computer 50 can access image data stored in the virtual drive area 12*d*.

As a result, the user can execute various processes on the digital multifunction device 1, such as an image forming process, fax transmitting process, and mail transmitting process, by simply writing image data in the first through third folders of the virtual drive area 12*d*, with the same sense as writing data to the hard disk 54 of the personal computer 50. Accordingly, the user can easily operate the digital multifunction device 1 from the personal computer 50 end.

Moreover, by enabling the personal computer 50 to recognize the virtual drive area 12*d* as an external storage device in the preferred embodiment based on the USB standard supporting Plug and Play, which is widely used in personal computers 50, the user need not install a special driver or the like for enabling the personal computer 50 to recognize the virtual drive area 12*d*. The user can easily use the virtual drive function of the digital multifunction device 1 simply by connecting the personal computer 50 to the digital multifunction device 1 via the USB interface 37.

In the preferred embodiment, a program for the terminal-end fax transmitting process is installed on the personal computer 50. However, this is a program for supporting the writing of required data and is different from what we are calling a driver program. For example, in common applications, image data is converted to the MH format and written to the virtual drive area 12*d* together with the transmission specification file, enabling the device to use the fax transmission function.

Further, the digital multifunction device 1 is constantly monitoring the virtual drive area 12*d* in S610 to determine whether data has been written to the virtual drive area 12*d* from the personal computer 50. Accordingly, the digital multifunction device 1 can immediately execute a prescribed process on this data (image forming process, fax transmitting process, or mail transmitting process) when data is written to the virtual drive area 12*d*. Hence, the digital multifunction device 1 can prevent user from dissatisfaction caused when data written to the virtual drive area 12*d* is not processed for a long period of time. In other words, the user can use the digital multifunction device 1 satisfactorily.

In addition, the digital multifunction device 1 is configured to delete image data read during the second image forming process, the first fax transmitting process, and the mail transmitting process from the virtual drive area 12*d*. Accordingly, the digital multifunction device 1 can make efficient use of the virtual drive area 12*d*, while not needing to prompt the user to delete data or the like.

Further, the digital multifunction device 1 can receive specifications for transmission time from the personal computer 50 and can transmit image data at this transmission time. Therefore, the digital multifunction device 1 can prevent user dissatisfaction at the transmission destination caused when the external facsimile machine 5 on the image data receiving end operates late at night or the like.

Since the virtual drive area 12*d* has a folder structure as shown in FIG. 2(*a*) in the embodiment described above, obviously data for the folder to which a data file (that is, image data) belongs is written to the virtual drive area 12*d* as classification data when storing the data file. Since the folder (directory) structure is provided in the virtual drive area 12*d*, a process mode can be selected based on classification data to perform one of various processes on the image data according to the user's wishes.

Further, the user can transmit image data to an external facsimile machine connected to the network via the digital multifunction device simply by writing the image data and destination data to the virtual drive area 12*d* through operations on the personal computer 50 as the terminal device.

Conventionally driver programs or the like have been necessary to operate a facsimile machine or the like from the terminal device end. However, the present embodiment can acquire image data from the personal computer 50 and transmit this data to an external facsimile machine without requiring a driver to be installed on the personal computer 50. Incidentally, the present embodiment does not restrict the installation of a program on the personal computer 50 for supporting writing to the virtual drive area 12*d*.

When image data is written from the personal computer 50 to the virtual drive area 12*d*, either the first or second process mode is selected based on classification data (data for the folder in which the image data is written or the like) for the image data that was written together with the image data in the virtual drive area 12*d* and a process corresponding to the process mode on the image data is executed. Thus, the image formation based on the image data or data transmission for transmitting the image data can be performed simply by writing image data and the like to the virtual drive area 12*d*.

The programs for implementing the various processes executed by the CPU 10 and the CPU 51 can be supplied to the user on a recording medium such as a CD-ROM or flexible disk.

While the invention has been described in detail and with reference to the specific embodiment thereof, it would be apparent to those skilled in the art that various changes and modifications may be made therein without departing from the scope of the invention. For example, the data processing device, facsimile machine, and computer program of the present invention may be configured in various forms and are not limited to the embodiment described above.

Further, in the preferred embodiment, the personal computer 50 and the digital multifunction device 1 are connected using the USB interface 37, and the personal computer 50 is enabled to recognize the virtual drive area 12*d* as an external storage device based on the USB standard. However, an interface according to the IEEE 1394 standard or another interface may be used in place of the USB interface 37. However, such interfaces should preferably support Plug and Play.

Further, a dialog box may be displayed on the display 55 in the terminal-end fax transmitting process that prompts the user to select an image quality mode for the facsimile data (standard, fine, or superfine). Image quality selection data for the image quality mode acquired from the input device may be embedded in the transmission specification file.

In addition, while the digital multifunction device 1 of the embodiment described above is configured so that the virtual drive function and the receiving/printing function may be on at the same time, certainly the digital multifunction device 1 may be configured so that only one of the functions may operate at any one time.

What is claimed is:

1. A data processing device connected to and in communication with a terminal device, comprising:
    a storing unit having a storage area for storing image data;
    a recognition setting unit that enables the terminal device to recognize the storage area in the storing unit as an external storage device based on a determination that the storing unit is available or prevents the terminal device from recognizing the storage area in the storing unit as the external storage device based on a determination that the storing unit is unavailable; and
    a data processing unit that reads image data from the storage area in the storing unit when image data is written to the storage area from the terminal device and executes a prescribed process on the image data.

2. The data processing device as claimed in claim 1, wherein the terminal device is provided with a Plug and Play function for automatically recognizing a device connected to and in communication with the terminal device, the recognition setting unit using the Plug and Play function to enable the terminal device to recognize the storage area in the storing unit as an external storage device.

3. The data processing device as claimed in claim 1, wherein the data processing unit comprises a monitoring portion that constantly monitors the storage area in the storing unit to determine whether image data has been written to the storage area from the terminal device.

4. The data processing device as claimed in claim 1, further comprising a deleting unit that deletes image data from the storage area after the data processing unit has completed a predetermined process on the image data in the prescribed process.

5. The data processing device as claimed in claim 1, wherein:
    the prescribed process is an image forming process;
    the data processing device further comprises an image forming unit that forms an image on an image forming medium based on the image data; and
    the data processing unit comprises a reading portion that reads image data from the storage area in the storing unit when image data is written to the storage area from the terminal device, and a control portion that controls the image forming unit to form an image based on the image data.

6. The data processing device as claimed in claim 1, wherein:
    the prescribed process is a facsimile transmission process, in which the image data is affixed with a destination data indicative of a destination of the image data;
    the data processing device further comprises a communicating unit connected to an external network, and a data transmitting unit that transmits the image data to a specified destination through the communicating unit; and
    the data processing unit comprises a reading portion that reads image data from the storage area in the storing unit and reads the destination data from the storage area when the image data is written to the storage area from the terminal device, and a control portion that controls the data transmitting unit to transmit the image data to the destination based on the destination data.

7. The data processing device as claimed in claim 6, wherein the communicating unit is capable of communicating with an external facsimile machine via the network, the control portion controlling the data transmitting unit to transmit the image data as facsimile data to the external facsimile machine at the destination based on the destination data.

8. The data processing device as claimed in claim 1, wherein:
    the storing unit is capable of storing image data and classification data representing a classification of the image data; and
    the data processing unit comprises:
    a first mode processing portion providing a first prescribed process;
    a second mode processing portion providing a second prescribed process; and
    a selection portion selecting one of the first prescribed process and the second prescribed process based on the classification data for the image data that is written together with the image data in the storing unit at the time the image data is written to the storage area from the terminal device for executing a selected one of the first prescribed process and the second prescribed process.

9. The data processing device as claimed in claim 8, further comprising:

an image forming unit that forms an image on an image forming medium based on the image data;

wherein the first mode processing portion comprises:

a reading section that reads the image data from the storage area of the storing unit; and a control section that controls the image forming unit to form images based on the image data.

10. The data processing device as claimed in claim 9, further comprising:

a communicating unit connected to an external network; and a data transmitting unit that transmits the image data to a specified destination via the communicating unit;

wherein:

the image data is attached with destination data representing a destination for the image data, the destination data being also stored in the storage area; and the second mode processing portion comprises:

a reading section that reads image data from the storage area of the storing unit and reads the destination data from the storage area; and a control section that controls the data transmitting unit to transmit the image data to the destination based on the destination data.

11. The data processing device as claimed in claim 10, wherein:

the image data is also attached with transmission time data representing the transmission time for the image data, the transmission time data being also stored in the storage area;

the reading section also reads transmission time data; and the control section controls the data transmitting unit to transmit the image data to a destination based on the destination data at a time represented by the transmission time data.

12. The data processing device as claimed in claim 10, wherein:

the communicating unit is capable of communicating with an external facsimile machine via the network; and the control section controls the data transmitting unit to transmit the image data as facsimile data to the external facsimile machine at the destination based on the destination data.

13. The data processing device as claimed in claim 8, wherein the data processing unit further comprises a third mode processing portion providing a third prescribed process, the selection portion selecting one of the first prescribed process, the second prescribed process and the third prescribed process based on the classification data for the image data that is written together with the image data in the storing unit at the time the image data is written to the storage area from the terminal device for executing a selected one of the first prescribed process, the second prescribed process and the third prescribed process.

14. The data processing device as claimed in claim 13, further comprising:

a communicating unit connected to an external network; and a mail transmitting unit that transmits image data in an e-mail format to a specified destination;

wherein the image data is attached with destination data representing a destination for the image data, the destination data being also stored in the storage area; and the third mode processing portion comprises:

a reading section that reads image data from the storage area in the storing unit and reads destination data from the storage area; and a control section that controls the mail transmitting unit to transmit the image data in the e-mail format to a destination based on the destination data.

15. A facsimile machine comprising:

a communicating unit connected to an external network and capable of transmitting and receiving facsimile data; and a data processing device connected to and in communication with a terminal device through the external network, the data processing device comprising:

a storing unit having a storage area for storing the facsimile data;

a recognition setting unit that enables the terminal device to recognize the storage area in the storing unit as an external storage device based on a determination that the storing unit is available or prevents the terminal device from recognizing the storage area in the storing unit as the external storage device based on a determination that the storing unit is unavailable; and a data processing unit that reads the facsimile data from the storage area in the storing unit when the facsimile data is written to the storage area from the terminal device and executes a prescribed process on the facsimile data.

16. A computer-readable storage medium that stores a computer-executable program for permitting a facsimile machine to function as a data processing device, the facsimile machine including a communication unit connected to a terminal device through a network, and a storing unit including a storage area that stores therein image data, the program comprising:

instructions for enabling the terminal device to recognize the storage area in the storing unit as an external storage device based on a determination that the storing unit is available or prevents the terminal device from recognizing the storage area in the storing unit as the external storage device based on a determination that the storing unit is unavailable; and instructions for reading image data from the storage area in the storing unit when image data is written to the storage area from the terminal device and executing a prescribed process on the image data.

* * * * *